United States Patent
Venkataramani et al.

(10) Patent No.: US 11,669,489 B2
(45) Date of Patent: Jun. 6, 2023

(54) SPARSE SYSTOLIC ARRAY DESIGN

(71) Applicant: International Business Machines Corporation, Armonk, NY (US)

(72) Inventors: Swagath Venkataramani, White Plains, NY (US); Sanchari Sen, West Lafayette, IN (US); Vijayalakshmi Srinivasan, New York, NY (US); Ankur Agrawal, Chappaqua, NY (US); Sunil K Shukla, Scarsdale, NY (US); Bruce Fleischer, Bedford Hills, NY (US); Kailash Gopalakrishnan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/490,830

(22) Filed: Sep. 30, 2021

(65) Prior Publication Data

US 2023/0109301 A1 Apr. 6, 2023

(51) Int. Cl.
  *G06F 15/80* (2006.01)
  *G06F 9/30* (2018.01)
  *G06F 7/50* (2006.01)
  *G06F 7/544* (2006.01)
  *G06F 7/523* (2006.01)

(52) U.S. Cl.
  CPC ............ *G06F 15/8046* (2013.01); *G06F 7/50* (2013.01); *G06F 7/523* (2013.01); *G06F 7/5443* (2013.01); *G06F 9/3001* (2013.01); *G06F 9/30069* (2013.01)

(58) Field of Classification Search
  None
  See application file for complete search history.

(56) References Cited

U.S. PATENT DOCUMENTS

| | | | |
|---|---|---|---|
| 9,818,059 B1* | 11/2017 | Woo | G06N 3/0454 |
| 2016/0224465 A1 | 8/2016 | Morad et al. | |
| 2016/0358069 A1* | 12/2016 | Brothers | G06F 7/764 |
| 2019/0114542 A1* | 4/2019 | Kim | G06N 3/063 |
| 2019/0197420 A1 | 6/2019 | Singh et al. | |
| 2019/0205358 A1* | 7/2019 | Diril | G06F 17/16 |
| 2020/0150926 A1* | 5/2020 | Connor | G06F 7/523 |
| 2020/0210517 A1* | 7/2020 | Baum | G06F 9/30101 |

OTHER PUBLICATIONS

Kim, D. et al., ZeNA: Zero-Aware Neural Network Accelerator, 2018, IEEE, pp. 39-46. (Year: 2018).*
Chen, Yu-Hsin, et al., Eyeriss v2: A Flexible Accelerator for Emerging Deep Neural Networks on Mobile Devices. 2019, IEEE, pp. 292-308. (Year: 2019).*

(Continued)

*Primary Examiner* — Eric Coleman
(74) *Attorney, Agent, or Firm* — Peter J. Edwards

(57) ABSTRACT

A systolic array can be configured to skip distributed operands that have zero-values, resulting in improved resource efficiency. A skip module is introduced to receive operands from memory, identify whether they have a zero value or not, and, if they are nonzero, generate an operand vector including an index before sending the operand vector to a processing element.

20 Claims, 8 Drawing Sheets

(56) References Cited

OTHER PUBLICATIONS

"Method and circuit for implementing hyperbolic tangent activation function in neural network accelerators," IP.Com, An IP.com Prior Art Database Technical Disclosure, IP.com No. IPCOM000254761D, IP.com Electronic Publication Date: Jul. 30, 2018, 3 pages.

"Branching Neural Networks," IP.Com, An IP.com Prior Art Database Technical Disclosure, IP.com No. IPCOM000254791D, IP.com Electronic Publication Date: Aug. 2, 2018, 11 pages.

"Fine-Grained Reconfiguration of Deep Learning Hardware for Performance and Power Optimization," IP.Com, An IP.com Prior Art Database Technical Disclosure, IP.com No. IPCOM000257154D, IP.com Electronic Publication Date: Jan. 16, 2019, 5 pages.

Samajdar, et al., "SCALE-Sim: Systolic CNN Accelerator Simulator," arXiv:1811.02883v2 [cs.DC] Feb. 2, 2019, 11 pages.

Chen et al., "Eyeriss v2: A Flexible Accelerator for Emerging Deep Neural Networks on Mobile Devices," arXiv:1807.07928v2 [cs.DC] May 20, 2019, 21 pages.

Kung et al., "Packing Sparse Convolutional Neural Networks for Efficient Systolic Array Implementations: Column Combining Under Joint Optimization," ACM, ASPLOS 2019, 14 pages.

Sen et al., "SPARCE: Sparsity aware General Purpose Core Extensions to Accelerate Deep Neural Networks," IEEE Transactions on Computers, Nov. 29, 2017, 13 pages, available at https://www.researchgate.net/publication/321160550_SparCE_Sparsity_Aware_General-Purpose_Core_Extensions_to_Accelerate_Deep_Neural_Networks.

Jouppi et al., "In-Datacenter Performance Analysis of a Tensor Processing Unit," 44th International Symposium on Computer Architecture (ISCA), Toronto, Canada, Jun. 26, 2017, 17 pages, available at https://arxiv.org/ftp/arxiv/papers/1704/1704.04760.pdf.

Fleischer et al., "A Scalable Multi-TeraOPS Core for AI Training and Inference," IEEE Solid-State Circuits Letters (vol. 1, Issue 12), Dec. 2018, 2 pages, available at: https://ieeexplore.ieee.org/document/8657745.

Zhang et al., "Cambricon-X: An accelerator for sparse neural networks," 2016 49th Annual IEEE/ACM International Symposium on Microarchitecture (Micro), Oct. 15, 2016, 12 pages, available at: https://ieeexplore.ieee.org/abstract/document/7783723.

Parashar et al., "SCNN: An Accelerator for Compressed-sparse Convolutional Neural Networks," May 23, 2017, 12 pages, available at: https://arxiv.org/pdf/1708.04485.pdf.

Albericio et al., "Cnvlutin: Ineffectual-Neuron-Free Deep Neural Network Computing," 2016 ACM/IEEE 43rd Annual International Symposium on Computer Architecture (ISCA), Jun. 18, 2016, 13 pages, available at: https://ieeexplore.ieee.org/document/7551378.

Shaaban, "Systolic Architectures," EECC 756, Spring 2003, 9 pages, available at: https://slideplayer.com/slide/3381388/.

Sen et al., "Exploiting Fine-grained Structured Weight Sparsity in Systolic Arrays," U.S. Appl. No. 17/444,187, filed Jul. 31, 2021.

Deng et al., "PermDNN: Efficient Compressed DNN Architecture with Permuted Diagonal Matrices," IEEE, 2018 51st Annual IEEE/ACM International Symposium on Microarchitecture, 2018, 14 pages, https://ieeexplore.ieee.org/document/8574541.

Lascorz et al., "Bit-Tactical: A Software/Hardware Approach to Exploiting Value and Bit Sparsity in Neural Networks," Association for Computing Machinery, Apr. 13-17, 2019,15 pages, https://www.eecg.toronto.edu/~mostafam/files/TCL_ASPLOS2019.pdf.

Chen et al., "14.5 Eyeriss: An energy-efficient reconfigurable accelerator for deep convolutional neural networks," IEEE, 2016 IEEE International Solid-State Circuits Conference (ISSCC), 2016, 3 pages, https://ieeexplore.ieee.org/document/7418007.

Aimar et al., "NullHop: A Flexible Convolutional Neural Network Accelerator Based on Sparse Representations of Feature Maps," IEEE Transactions on Neural Networks and Learning Systems, vol. 30, No. 3, Mar. 2019, 13 pages, https://ieeexplore.ieee.org/document/8421093.

Han et al., "EIE: Efficient Inference Engine on Compressed Deep Neural Network," ISCA '16: Proceedings of the 43rd International Symposium on Computer Architecture, Jun. 2016, pp. 243-254, https://dl.acm.org/doi/10.1109/ISCA.2016.30.

Moons et al., "A 0.3-2.6 TOPS/W Precision-Scalable Processor for Real-Time Large-Scale ConvNets," 2016 IEEE Symposium on VLSI Circuits (VLSI-Circuits), Jun. 2016, 2 pages, https://ieeexplore.ieee.org/document/7573525.

Moons et al., "14.5 Envision: A 0.26-to-10TOPS/W subword-parallel dynamic-voltage-accuracy-frequency-scalable Convolutional Neural Network processor in 28nm FDSOI," 2017 IEEE International Solid-State Circuits Conference (ISSCC), Feb. 2017, 3 pages, https://ieeexplore.ieee.org/document/7870353.

Li et al.," CCR: A Concise Convolution Rule for Sparse Neural Network Accelerators," 978-3-9819263-0-9/DATE18/c©2018 EDAA, Printed Jan. 27, 2023, 6 pages, https://past.date-conference.com/proceedings-archive/2018/pdf/0382.pdf.

* cited by examiner

SPARSE SYSTOLIC ARRAY DESIGN

BACKGROUND

Deep Neural Networks (DNNs) exhibit significant amounts of sparsity in their data-structures. For instance, the amount of activation sparsity in different state-of-the-art deep networks ranges between 25-60% while the amount of weight sparsity ranges between 18-85%. The presence of zero values in these data-structures causes a large number of multiply-accumulate (MAC) operations performed in the corresponding DNNs to become redundant.

A systolic array is composed of matrix-like rows of data processing units called tiles, or processing elements (PEs). Each PE shares the information with its neighbors immediately after processing. The systolic array is often rectangular where data flows across the array between neighbor data processing units, often with different data flowing in different directions.

An example of a systolic algorithm might be designed for matrix multiplication. One matrix is fed in a row at a time from the top of the array and is passed down the array, the other matrix is fed in a column at a time from the left hand side of the array and passes from left to right. Dummy values are then passed in until each processor has seen one whole row and one whole column. At this point, the result of the multiplication is stored in the array and can now be output a row or a column at a time, flowing down or across the array.

SUMMARY

Some embodiments of the present disclosure can be illustrated as a method. The method includes receiving a sequence of operands from a memory, the sequence including at least three operands. The method also includes identifying that the first operand is a nonzero operand, that the second operand is a zero-value operand, and that the third operand is a nonzero operand. The method also includes generating a first operand vector based on the identifying that the first operand is a nonzero operand. The method also includes skipping the second operand based on the identifying that the second operand is a zero-value operand. The method also includes generating a second operand vector based on the identifying that the third operand is a nonzero operand. The method also includes sending the first operand vector and the second operand vector to each processing element included in a row of processing elements.

Some embodiments of the present disclosure can be illustrated as a system. The system may comprise memory, a central processing unit (CPU), and a skip module. The skip module may be configured to perform the method discussed above.

The above summary is not intended to describe each illustrated embodiment or every implementation of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
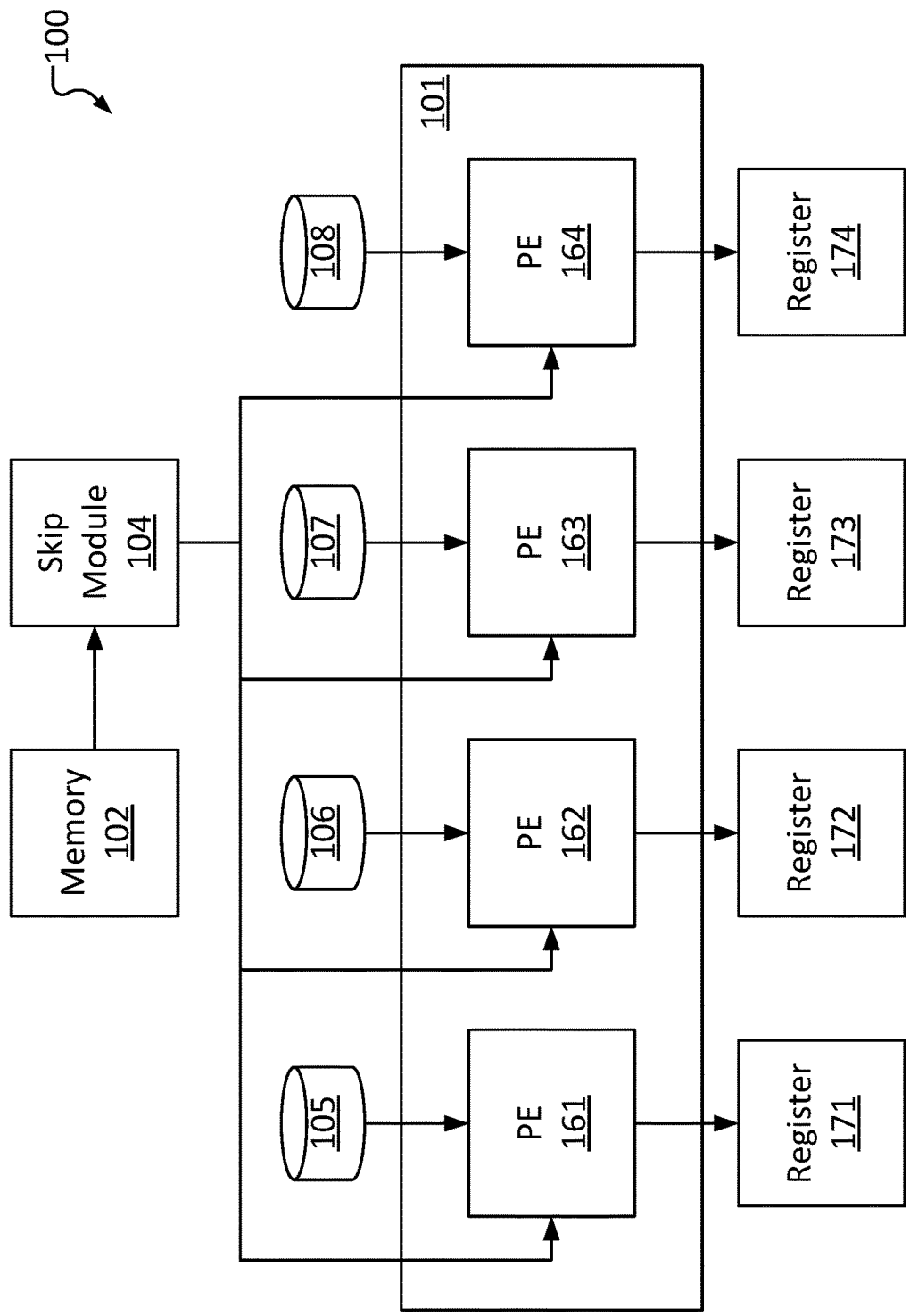
FIG. 1 illustrates a high-level block diagram of a row of processing elements (PEs), a memory, and a skip module, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

As a simplified overview, systems and methods consistent with the present disclosure enable detecting multiple upcoming multiply-by-zero operations and skipping them to increase efficiency. However, accomplishing this introduces additional challenges, such as timing concerns, that are also addressed herein.

Systolic arrays are becoming increasingly popular in different deep learning accelerators because of their ability to efficiently realize convolutional and fully-connected layers. However, the regular and synchronized nature of computations performed via systolic arrays pose a serious challenge to exploiting sparsity in the deep neural networks (DNNs) executing on them. Specifically, skipping sparsity-induced redundant multiply-accumulate (MAC) operations in individual processing elements (PEs) of the systolic array often does not translate into overall execution time and energy reductions, as they are limited by the slowest processing element in a row or column. Systems and methods consistent with the present disclosure provide techniques to overcome these challenges and exploit sparsity in the data structure (weight or activation) mapped as the non-SIMD operand in the array.

The shared (or "splat," also known as "non-SIMD") operand in a systolic array is defined as the horizontally fed operand which is spatially reused across all MAC units within a row of the systolic array. Exploiting sparsity in this operand thus involves skipping MACs across a row on detecting a zero value.

To achieve the same, systems and methods consistent with the present disclosure enable augmenting each PE row with a new "skip module" capable of selecting non-zero operands from a computation set before splatting and injecting into the row.

However, translating this MAC skipping to actual execution time savings involves overcoming additional challenges introduced by workload imbalances across threads and rows, as well as challenges introduced by use of different low-precision implementations and different dataflow variants in the systolic array. Systems and methods consistent with the present disclosure enable various techniques to overcome these challenges to achieve significant execution time benefits across a range of workloads exhibiting different amounts of sparsity.

This disclosure contains discussion of contents of various arrays and vectors as well as positions within those data structures. While many computer science and hardware applications describe/treat a first position of an array as having an index of [0], in the interest of readability, this disclosure treats a first position of an array as having an index of [1]. For example, given a set of values (8; 4; 3; 0), for purposes of this disclosure, the value "8" is considered to be at index [1], the value "4" is considered to be at index [2], etc.

FIG. 1 illustrates a high-level block diagram of a systolic array 100 including a row 101 of processing elements (PEs), a memory 102, and a skip module 104, consistent with several embodiments of the present disclosure. While skip module 104 is central to the present disclosure, an initial description of the surrounding elements of systolic array 100 is provided first for better understanding.

Each PE (i.e., PE 161, PE 162, PE 163, and PE 164) of row 101 may be configured to receive a first operand and a second operand, to multiply them, and to add the product to an accumulator (such as register 171). This is known as a "multiply-accumulate," or "MAC" operation. For example, PE 161 may receive a first operand "3" and a second operand "4," multiply them (3*4=12), and add the product 12 to a value stored in register 171 (e.g., if register 171 was storing a value of 5 before the example MAC operation, then register 171 would, in this example, be storing a value of 5+12=17 after the example MAC operation).

Memory 102 contains a set of data (not shown in FIG. 1) to be used as operands for PEs in row 101. For example, memory 102 may include a set of 8 operands, [3, 9, 0, 5, 0, 2, 0, 0]. The operands stored in memory 102 may be referred to as "splat" operands. As used herein, a "splat" operand is an operand that is sent to all PEs in a set of PEs (in this instance, row 101). Splat operands can also be referred to as "non-SIMD" operands, with "SIMD" referring to "Single Instruction, Multiple Data." For example, a splat operand of "3" may be sent to PE 161, PE 162, PE 163, and PE 164.

In some embodiments, each PE may utilize one splat operand and one non-splat operand for performing operations. While each PE in row 101 receives the same splat operand, in contrast, each PE in row 101 may receive different non-splat operands. Non-splat operands can be received from non-splat operand registers (referred to herein as "operand registers" for brevity), such as operand register 105. For example, PE 161 may receive a splat operand "3" from memory 102 (via skip module 104, as discussed in further detail below) and a non-splat operand "4" from non-splat operand register 105. PE 161 may then multiply the splat operand by the non-splat operand (3*4=12), and add the result (12) to register 171. PE 162 may also receive the splat operand "3" from skip module 104, but may receive a different non-splat operand "1" from operand register 106. PE 163 may receive splat operand "3" from skip module 104, but may receive a non-splat operand "80" from operand register 107, etc. While non-splat operands may typically be different, this is not guaranteed or necessary; PEs may coincidentally receive identical non-splat operands. For example, PE 164 may receive a non-splat operand of "4" from operand register 108; while both PE 161 and PE 164 may both have received "the same" non-splat operand (i.e., 4), they were received from different operand registers (i.e., 105 and 108, respectively).

PEs 161-164 may be configured to add their outputs to registers 171-174, respectively. In some instances, registers 171-174 may have initial values. For example, register 171 may store a value of "14." PE 161 may receive its splat operand (3) and non-splat operand (4), multiply them together (3*4=12), and add the product (12) to register 171 (14+12=26). Register 171 may then store this result (26).

As mentioned, once PE 161 has both the splat operand and non-splat operand, it may multiply them together and add the product to a register, such as register 171. PEs 162-164 may also add their products to similar registers; for example, PE 162 may add its product to register 172, PE 163 may add its product to register 173, and PE 164 may add its product to register 174.

Thus, in operation, each PE of row 101 receives the same splat operand from memory 102 (via skip module 104), receives its own non-splat operand, multiplies the splat operand by its non-splat operand, and adds the product to a register. This can be repeated for the next splat operand in memory 102 and a next non-splat operand, resulting in another product, which may then be added to the result stored in the register. For example, register 171 may have an initial value of "14." PE 161 may receive two operands (3 and 4) and multiply them, adding the result to (12) to the register, such that register 171 may have a value of "29." PE 161 may then receive another splat operand (e.g., 7) from skip module 104 and another non-splat operand (e.g., 10) from operand register 105 and multiply them (7*10=70). PE 161 may then add this second product (70) to register 171 (26+70=96), resulting in register 171 storing a value of 96, and so on.

In some instances, operand registers 105-108 may be implemented as different regions of memory 102 (e.g., PE 160 may receive splat operand "3" from a first region of memory 102 (not labeled in FIG. 1) and non-splat operand "4" from a second region of memory 102 (not labeled in FIG. 1)).

In some instances, each PE of row 101 may perform its operations simultaneously; for example, PE 161 may receive splat operand "3" and non-splat operand "4," multiply them together and add result "12" to register 171, but at the same time, PE 162 may receive splat operand "3" and non-splat operand "1," multiply them together and add result "3" to register 172.

Figure 5:
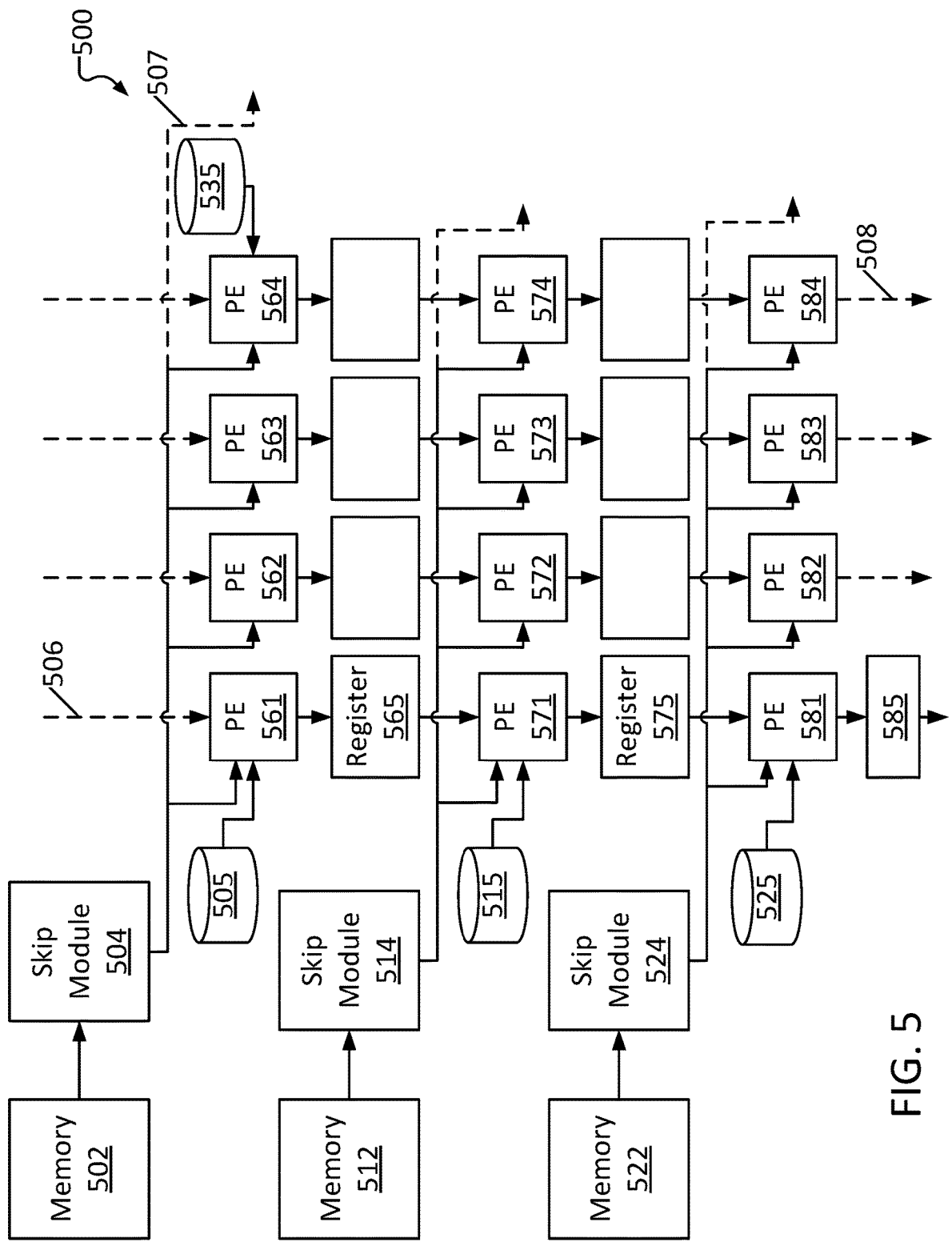
FIG. 5 illustrates a block diagram of a grid of PEs arranged into rows and columns, memories, and skip modules, consistent with several embodiments of the present disclosure.
Figure 6:
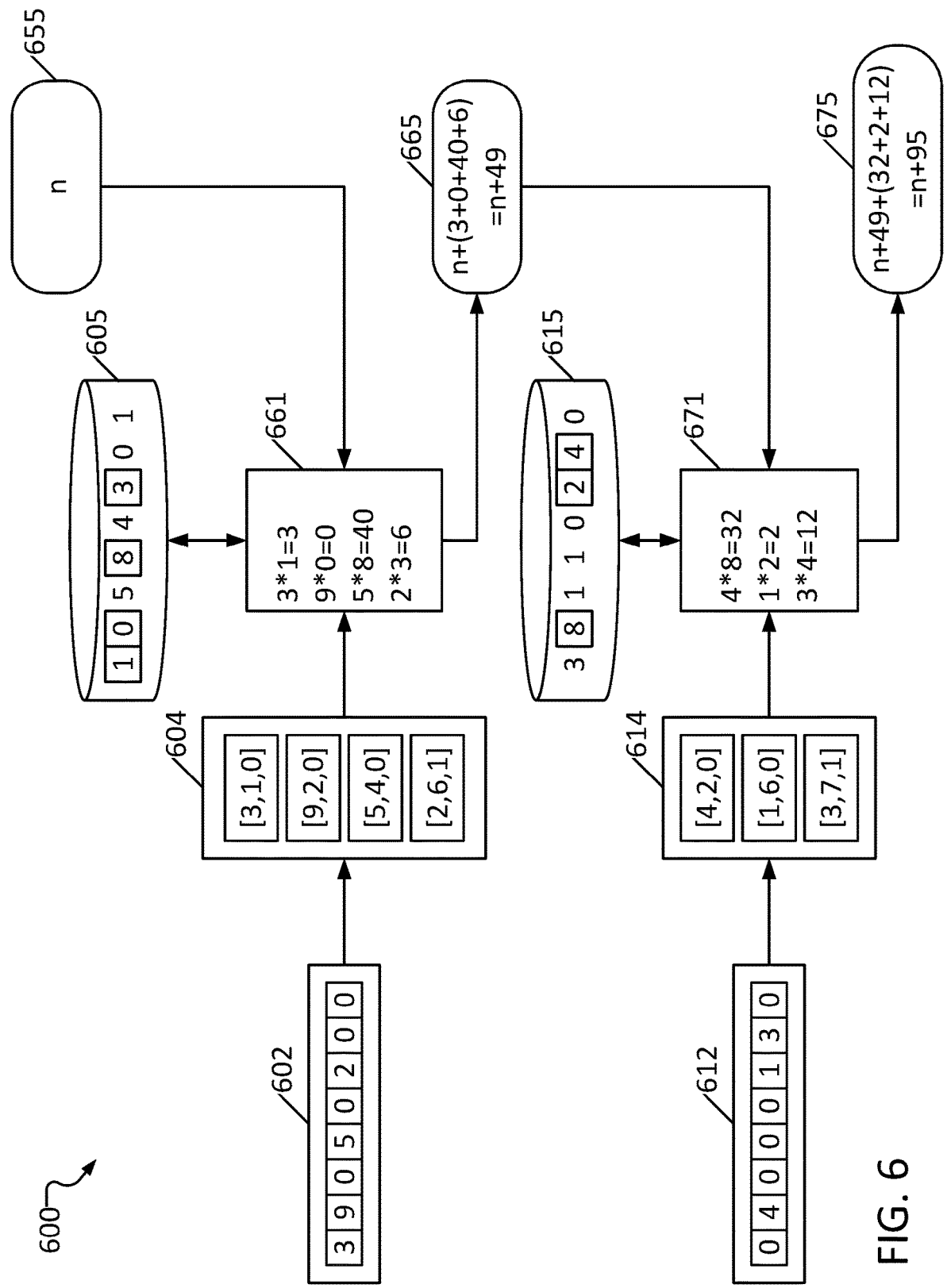
FIG. 6 depicts a portion of an example system performing multiple MAC operations, consistent with several embodiments of the present disclosure.

In some instances, multiple rows of PEs may be implemented (not shown in FIG. 1). In such instances, an initial value of a register may be a cumulative result of a previous row's register. Continuing with the previous example, register 171's cumulative result (29) may be output and copied to an additional register (not shown in FIG. 1), and another PE (not shown in FIG. 1) may receive additional operands, perform another MAC operation, and add the result to the additional register. Such a "grid" embodiment is depicted in FIG. 5 and discussed in further detail below. In addition, an illustrative example of one "column" of the grid is depicted in FIG. 6, discussed in further detail below.

However, if a splat operand is zero, then for each PE of row 101, this process may include receiving the splat operand (0), receiving a non-splat operand (x), multiply the non-splat operand by zero (resulting in 0*x=0), and add the result (i.e., 0) to the register (making no change to the value stored in the register). As will be apparent to those of skill in the art, this constitutes several redundant operations. Thus, in order to improve efficiency of systolic array 100, skip module 104 is introduced.

Skip module 104 is configured to receive the set of splat operands from memory 102 and essentially "prune" the set to only include non-zero operands. This enables skipping the redundant operations associated with splat operands having a value of zero ("zero-value operands"). Skip module 104 may then send the non-zero splat operands to the PEs in row 101. In order to ensure that the nonzero splat operands are multiplied by the appropriate non-splat operands, skip module 104 may include an index that indicates which splat operand is being sent to the PEs. For example, PE 161 may be configured to perform a first MAC operation using a first splat operand and a first non-splat operand, a second MAC operation using a second splat operand and a second non-splat operand, and a third MAC operation using a third splat operand and a third non-splat operand. If the second splat operand is zero, the second MAC operation may be redundant and may therefore be skipped. Thus, PE 161 may simply receive the first splat operand and the third splat operand. In order to enable PE 161 to appropriately perform the "third" MAC operation, the index may be included in the operand vector; otherwise, PE 161 may erroneously multiply the third splat operand by the second non-splat operand, as PE 161 may not be "aware" that the second splat operand has been skipped. Further, skip module 104 may append an "is_last?" bit, indicating whether the splat operand is the last operand in the set. Operation of the skip module 104 is described in further detail below with reference to FIG. 2.

Figure 2:
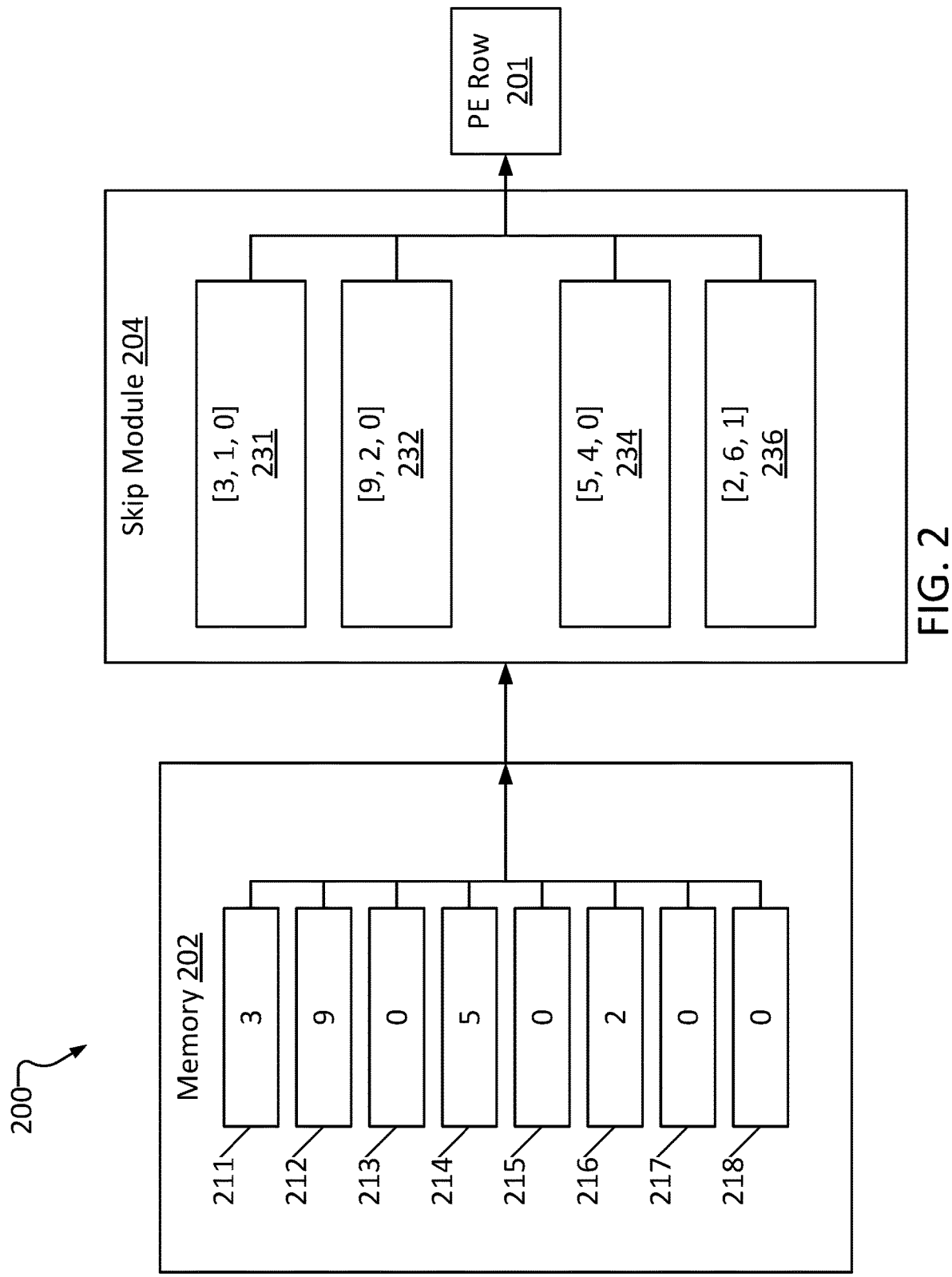
FIG. 2 illustrates a block diagram of inputs to a skip module from a memory stick, consistent with several embodiments of the present disclosure.

FIG. 2 illustrates a block diagram of a system 200 including operands input to a skip module 204 from memory 202, consistent with several embodiments of the present disclosure. Memory 202 is shown with eight operands numbered 211-218, including four nonzero operands and four zero-value operands; operand 211 has a value of 3 (nonzero), operand 212 has a value of 9 (nonzero), operand 213 has a value of 0 (zero), operand 214 has a value of 5 (nonzero), operand 215 has a value of 0 (zero), operand 216 has a value of 2 (nonzero), operand 217 has a value of 0 (zero), and operand 218 has a value of 0 (zero). For clarity, the exact number of operands (here, eight) as well as their values (i.e., 3, 9, 0, etc.) are used for example purposes only; in other instances, more or fewer operands may be used, and the values may vary. Each of operands 211-218 may be a splat operand, meaning it is to be sent to each processing element (PE) in PE row 201.

As shown in FIG. 2, skip module 204 receives these operands and generates "operand vectors" 231, 232, 234, and 236 based on the nonzero inputs. An operand vector includes multiple values: the operand itself, an index, and a "is_last?" indicator. For example, operand 211, being nonzero, is used by skip module 204 to generate operand vector 231. Operand vector 231, shown to be [3,1,0], includes the operand itself (operand 211, which is 3), an index showing that operand vector 231 is generated from the first input (1), and an "is_last?" indicator showing that operand vector 231 is not the last operand vector being sent to a row of processing elements (0). Similarly, operand vector 232, generated based on operand 212 (i.e., 9), is shown to be [9, 2, 0], including the operand (9), the index (2), and the "is_last?" indicator (0). As operand 213 is zero, it is "skipped," which means skip module 204 does not create a corresponding operand vector. Thus, skip module 204 instead next creates operand vector 234 based on operand 214. Operand vector 234 includes the operand (5), the index (4), and the "is_last?" indicator (0). Notably, even though operand vector 234 is the third operand vector, the index is "4" to enable processing elements to multiply the operand (5) by the correct non-splat operand. Put simply, system 200 may be configured to multiply the operand in memory 202 by corresponding non-splat operands (not shown in FIG. 2); the first splat operand (3) might be multiplied by a first non-splat operand (for example, 4), the second splat operand (9) might be multiplied by a second non-splat operand (for example, 7), and so on. As the third splat operand (0) is skipped, if the index of the splat operand is not tracked in the operand vector, the PE may erroneously multiply the fourth splat operand (operand 214, which is "5") by a third non-splat operand instead of a corresponding fourth non-splat operand. In other words, tracking the index enables ensuring skipping a splat operand also allows skipping the corresponding non-splat operand. In some instances, skip module 204 may create an operand vector for a zero operand but may not send it to a row of processing elements (PEs).

While checking the operands for zeroes and creating operand vectors of the nonzero vectors have associated computational costs, this cost may be outweighed by the savings resulting from reducing redundant zero MAC operations, particularly for deep neural network (DNN) applications. This is due in part to the relatively "sparse" nature of DNN applications; in simple terms, zero-value operands are relatively commonplace in these applications. The savings are further boosted by the distributed nature of the splat operands; since a single splat operand is supplied to multiple PEs, each splat operand being checked is effectively (in terms of resource cost) checking multiple operations simultaneously.

Non-splat operands may also be zero, which may similarly result in wasted operations. Thus, a "non-splat-operand-side" skip module may also appear useful, and in some instances may be implemented. However, in systolic array systems such as the examples depicted in this disclosure, splat operands are supplied to entire rows, but non-splat operands are supplied to individual processing elements (PEs). Every individual processing element may receive a non-splat operand different from that received at all other processing elements. This eliminates the "multiple operations checked for the performance cost of checking one" efficiency, which can render the cost of checking each non-splat operand higher than the expected savings gained from skipping zero-value non-splat operands. Thus, in some embodiments, skip module 204 may only receive and analyze splat operands.

In some instances, operands in memory 202 may be organized into sets, also known as "data sticks." For example, in memory 202, operands 211-218 may comprise a first data stick, while a second group of eight operands (not shown in FIG. 2) may comprise a second data stick. In operation, the operands of a given stick may be utilized in sequential MAC operations; for example, in some instances, operands 211-218 may be sent to PEs in PE row 201. Notably, in some instances, a value in a register may only be passed to a next row once the MAC operations have been performed on each nonzero operand in a data stick. This is described in further detail below with reference to FIG. 5, but as a brief overview, this is enabled by the use of the "is_last?" bit; ordinarily, a PE might be able to know to pass a result from an 8-operand data stick after performing an 8th MAC operation. However, if some operands are skipped for having a value of zero (in accordance with the present disclosure), an 8-operand data stick may only result in, for example, 5 MAC operations before a final result is ready to be passed to a next row. As the PE is not performing the skipping, the PE is not directly made aware of how many operands have been skipped. Thus, the PE may be ordinarily unable to determine when to pass the result.

Figure 3:
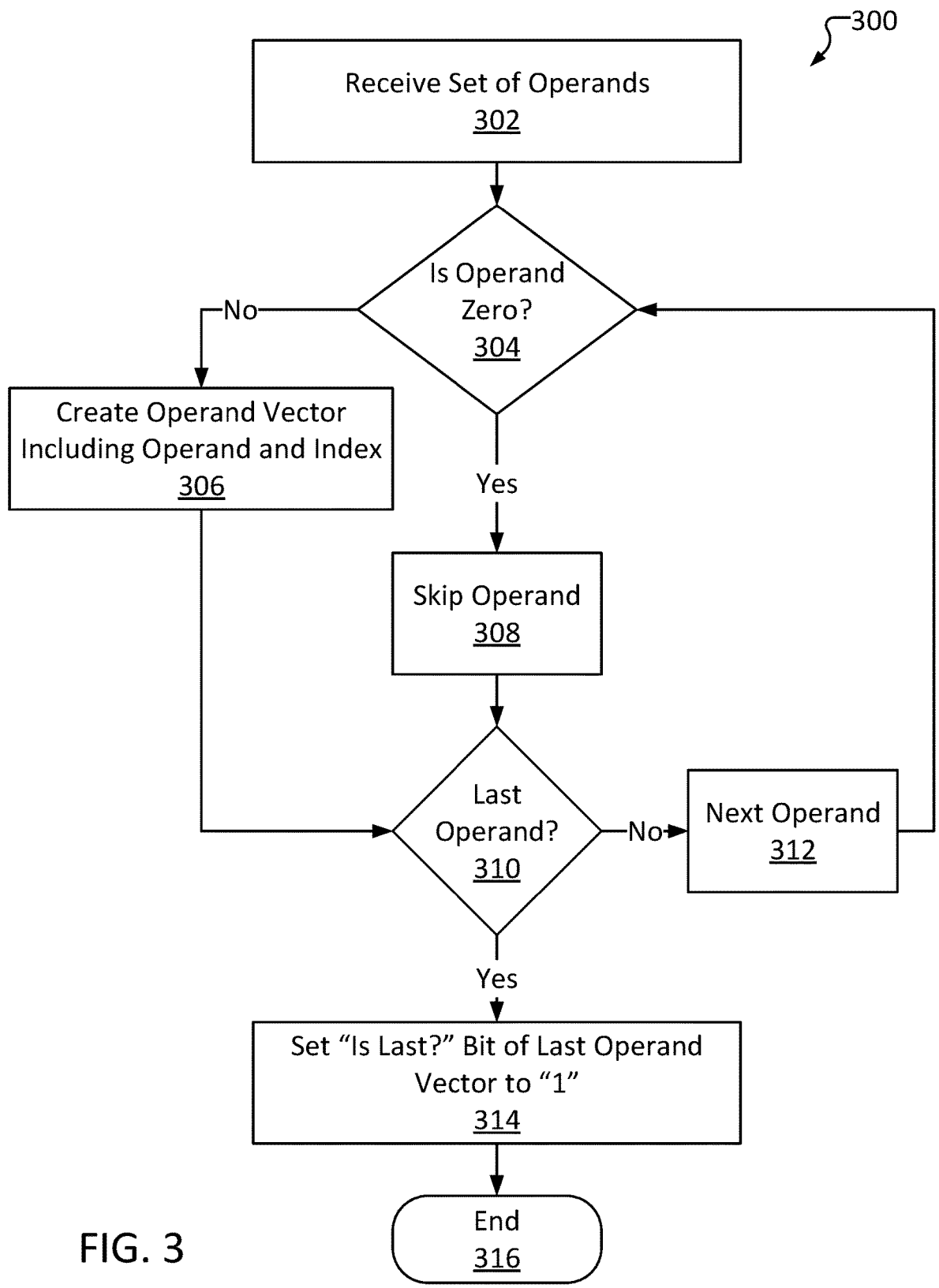
FIG. 3 depicts a method of operation for a skip module, consistent with several embodiments the present disclosure.

FIG. 3 depicts a method 300 of operation for a skip module, consistent with several embodiments the present disclosure. Method 300 may be performed by, for example, skip module 104 as discussed above with reference to FIG. 1 and/or skip module 204 as discussed above with reference to FIG. 2. Method 300 comprises receiving a set of splat operands at operation 302. The splat operands may be received from, for example, memory such as memory 102 or memory 202.

Method 300 further comprises determining whether an operand has a value of zero at operation 304. Operation 304 may be performed via a simple check understood by those of ordinary skill in the art, such as by using an AND gate, a comparator that compares the value with zero, etc.

If the operand is zero (304 "Yes"), the operand is skipped at operation 308. Operation 308 may include, for example, incrementing a value stored in an index register by 1 (to be used as an index in future operand vectors). Upon skipping the operand, method 300 proceeds to operation 310, discussed further below.

If the operand is nonzero (304 "No"), method 300 further comprises creating an operand vector at operation 306. The operand vector may include the operand, an index, and an "is_last?" indicator bit. In some instances, the index may be received from the memory. In some instances, the skip module performing method 300 may keep track of the index, such as by incrementing a value in a register at each iteration of operation 304 or at each iteration of operation 306 and 308.

Method 300 further comprises determining, at operation 310, whether the checked operand is the final operand from the set of operands received via operation 302. If the checked operand is not the final operand (310 "No"), meaning there are more operands to check, method 300 further comprises checking a next operand at operation 312 by looping back to determining whether the next operand is zero at operation 304. In some instances, operation 310 can also include sending the operand vector to a processing element (or each processing element in a row of PEs). However, in some instances, the operand vectors may only be sent out after the last operand has been checked (310 "Yes").

If the checked operand is the last operand (310 "Yes"), method 300 further comprises setting an indicator bit (e.g., an "is_last?" bit") of the last operand vector to "1" at operation 314. Notably, if the last operand is zero, then the last operand may not have an operand vector (as it will have been skipped via 308). In such an instance, operation 314 may include setting an "is_last?" indicator bit of a most-recently-generated operand vector to "1." As will be understood by those of ordinary skill in the art, alternatives to setting an "is_last?" bit to "1" are fully considered; for example, a "more_operands?" bit may be set to "0" instead. Method 300 may then end at 316.

As an example, the set of operands received at operation 302 may correspond to the example set stored in memory 202 as depicted in FIG. 2 (i.e., [3, 9, 0, 5, 0, 2, 0, 0]). In such an example, method 300 may produce the operand vectors depicted in FIG. 2 (i.e., vector 231 [3, 1, 0]; vector 232 [9, 2, 0]; vector 234 [5, 4, 0]; and vector 236 [2, 6, 1]). A detailed walkthrough of this example in the context of method 300 is provided below as a further clarifying example:

In this example, splat operands 211-218 are received from memory at operation 302. The skip module checks whether operand 211 is zero at operation 304. It is nonzero, so the skip module creates an operand vector 231 including the operand, the index, and an "is_last?" bit. Operand 211 is checked to determine if it is the last operand at operation 310. It is not the last operand, so the process iterates to the next operand (operand 212) at operation 312. This second operand is checked at 304, and because its value (9) is also nonzero, the system creates an operand vector 232, checks whether it is the last operand, and, because it is not, iterates to the next operand again at 312. This third operand is zero (304 "Yes"), so it is skipped via 308; no operand vector is created, and instead the skip module proceeds to operation 310 to determine whether the third operand is the last operand. This process continues until the eighth operand 218, which is zero, so no operand vector is created and the operand is skipped via 308. However, at operation 310, it is detected that the operand is the last operand of the input set. Therefore, the "is_last?" indicator bit of the last operand vector is set to "1" at operation 314. Because no operand vector was created for the eighth operand or the seventh because both of them are zero, operation 314 includes setting the "is_last?" indicator bit for the operand vector created for the sixth operand to "1." This is depicted in FIG. 2 as vector 236 having a final digit of "1" (i.e., [2, 6, 1]).

Once the operand vectors are created, they may be sent to processing elements (PEs) of a synaptic array for use in multiply-accumulate (MAC) operations. As the operand vectors generated via method 300 omit zero operands, method 300 enables skipping wasteful operations (such as multiplying by a zero and adding the resultant zero to a register).

Figure 4:
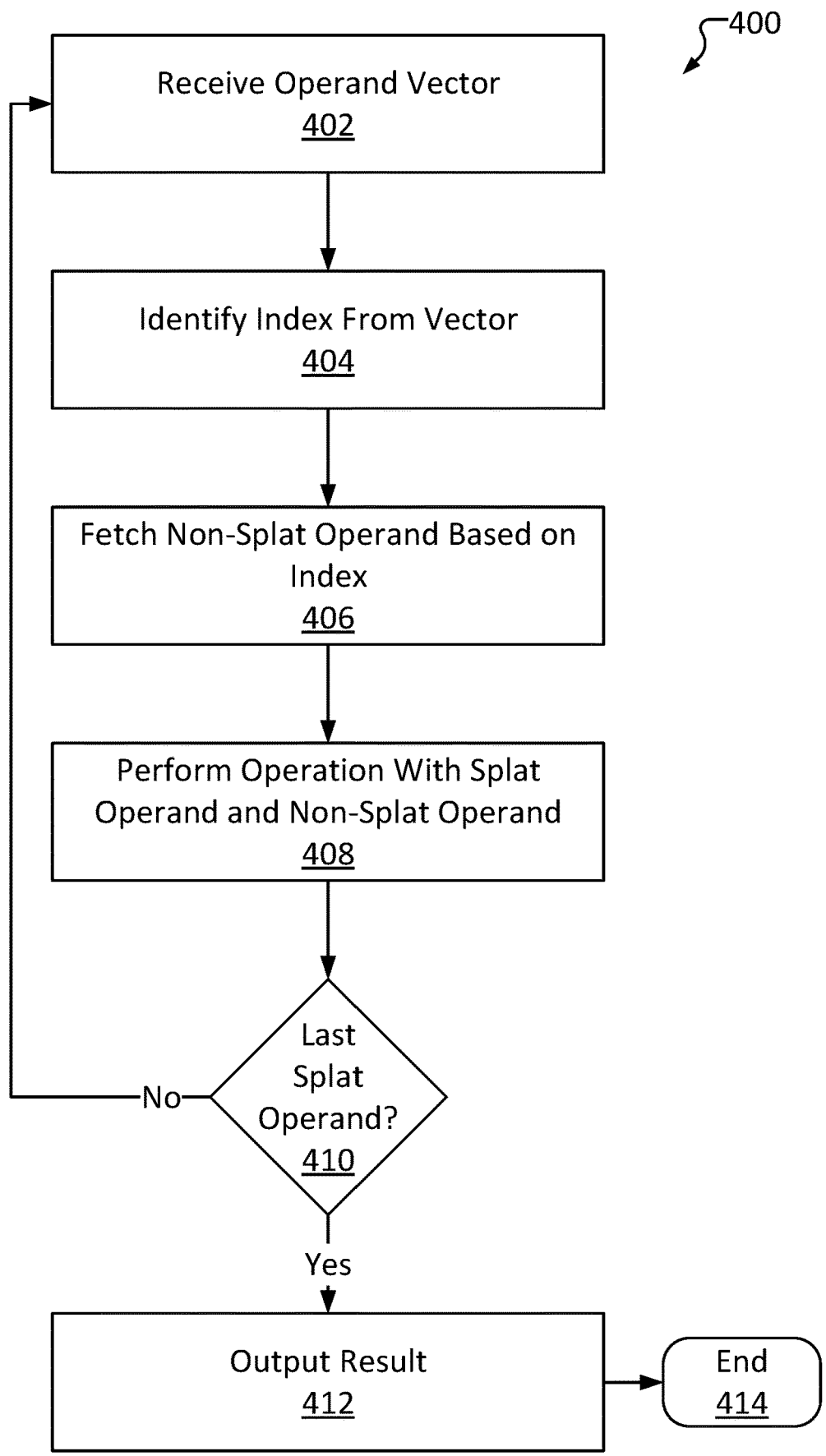
FIG. 4 depicts a method of operation for a processing element (PE), consistent with several embodiments the present disclosure.

FIG. 4 depicts a method 400 of operation for a processing element (PE), consistent with several embodiments the present disclosure. Method 400 comprises receiving an operand vector at operation 402. Operation 402 may include, for example, receiving data from a skip module electrically connected to the PE performing method 400. The operand vector may include a splat operand, an index, and an "is_last?" indicator bit.

Method 400 further comprises identifying an index from the operand vector at operation 404. As noted above, the operand vector received at operation 402 may include an index value. This index is useful in retrieving the appropriate non-splat operand, so it is identified at operation 404.

Method 400 further comprises fetching a non-splat operand at operation 406. Operation 406 may include fetching the non-splat operand from a table or register based on the index identified via operation 404. For example, a PE performing method 400 may have access to a register including a table of non-splat operands, and may have received an operand vector including an index of "3." Based on this index, the PE may retrieve a third non-splat operand from the table.

Method 400 further comprises performing, at 408, an operation with the splat operand (from operation 402) and the non-splat operand (from operation 406). The operation may include, for example, a multiply-accumulate (MAC) operation. Operation 408 may include adding a result of the operation to a value stored in a register.

Method 400 further comprises determining whether the operand vector is the last operand vector at operation 410. In ordinary systems, PEs may be able to identify when the last operand of a set has been utilized (e.g., as part of a MAC operation), because the set may have a fixed size and the PE can simply count how many operands it has utilized. However, in the context of method 400, PEs may only receive some, but not all, operands from a given set of operands, because zero-value operands may have been skipped. Thus, simply counting how many operands a PE has received/utilized may not suffice for determining which operand is the final one. To that end, operation 410 may include, for example, checking the "is_last" indicator bit of the operand vector; if the bit is "0," there are more operand vectors to receive (410 "No") and thus more operations to perform, so method 400 returns to receive the next operand vector at operation 402.

If the "is_last?" bit is "1," there may not be any more operands to perform operations upon (410 "Yes"). Once all operations are completed, method 400 further comprises outputting a result at operation 412. Operation 412 may include, for example, transmitting a signal to a controller to indicate that a final result is stored in a register. In some instances, operation 412 may include setting a value of a common bit or flag that is read by the next row to check if the previous row is done. Returning briefly to FIG. 1 for an example, operation 412 may include PE 161 indicating that the value currently stored in register 165 is the final value. Method 400 may then end at 414.

FIG. 5 illustrates a block diagram of a systolic array 500 including multiple memories, multiple skip modules, and a grid of PEs arranged into rows and columns, consistent with several embodiments of the present disclosure.

Systolic array 500 includes memory 502 to send a first set of splat operands to skip module 504, memory 512 to send a second set of splat operands to skip module 514, and memory 522 to send a third set of splat operands to skip module 524. Skip module 504 is configured to send operand vectors to each processing element (PE) in a first row of PEs (i.e., PE 561, PE 562, PE 563, and PE 564). Similarly, skip module 514 is configured to send operand vectors to each PE in a second row of PEs (i.e., PE 571, PE 572, PE 573, and PE 574) and skip module 524 is configured to send operand vectors to each PE in a third row of PEs (i.e., PE 581, PE 582, PE 583, and PE 584).

Non-splat operand register 505 (referred to as "operand register" 505 for brevity) may include stored non-splat operands. For example, PE 561 may receive a splat operand from skip module 504 and a non-splat operand from operand register 505. Similarly, operand register 515 may store non-splat operands to be used by PE 571, and operand register 525 may store non-splat operands to be used by PE 581. Notably, each PE may receive operands from its own operand register (e.g., PE 562 may receive non-splat operands from an operand register not shown in FIG. 5.). Thus, while some non-splat operands contained in, for example, operand register 505 may be zero (resulting in some wasted operations), the non-splat operands in each operand register are likely to be different. Therefore, "filtering" out zero-value non-splat operands, such as by an additional skip module, may not be result in significant performance improvements.

Memory 502, skip module 504, and PEs 561-564 may function substantially similarly to memory 102, skip module 104, and PEs 161-164, described above with reference to FIG. 1. PE 561 may store an output of its operations in a register 565. PE 571 may receive contents of register 565 and copy them to register 575. PE 571 may also add a result of its operations to register 575, whose contents may in turn be copied by PE 581 to register 585. Additional registers may also be included (e.g., between PE 562 and PE 572, between PE 574 and PE 584, "upstream" of PE 561, etc.). An example of this process is depicted in FIG. 6 and described in further detail below.

PEs 562-564 may receive their corresponding non-splat operands from operand registers, though, of these, only PE 564's operand register 535 is depicted in FIG. 5. Similarly, PEs 572-574 and PEs 582-584 may also have operand registers (not depicted in FIG. 5). PEs 561-564 may receive initial register values from registers not shown in FIG. 5 (represented by dashed lines such as 506). Further, additional PEs may be present on each row (represented by dashed lines such as 507). Additional rows of PEs (and skip modules) may also be implemented, represented by dashed lines such as 508.

Thus, in operation, skip module 504 may receive a first splat operand from memory 502. If the first splat operand is nonzero, skip module 504 may generate an operand vector and send the operand vector to PE 561 (as well as PE 562, PE 563, PE 564, and any other PEs in the same row). PE 561 may receive the first splat operand from skip module 504 and a first non-splat operand from operand register 505. PE 561 may multiply the splat operand by the non-splat operand and add the product to register 565. Skip module 504 may receive a second splat operand from memory 502. If the second splat operand has a value of zero, it is skipped. Skip module 504 may then receive a third splat operand from memory 502. If the third splat operand is nonzero, skip module 504 may generate a second operand vector and send the second operand vector to PEs 561-564. The second operand vector may include an index indicating that the operand contained within is the third operand (i.e., an index of 3). PE 561 may receive this second operand vector, identify the index of 3, and receive a corresponding non-splat operand from operand register 505 based on the index. For example, operand register may store non-splat operands (1, 0, 5, 8, 4, 3, 0, 1), and as the third value is "5," PE 561 may receive a non-splat operand of "5" from operand register 505. PE 561 may then multiply the third splat operand by 5, and add the product to register 565.

PE 562 may also receive the first splat operand from skip module 504 and a non-splat operand from another source, such as an additional operand register (not depicted in FIG. 5). Further, PE 562 may perform similar operations as PE 561; multiply the operands together, adding the product to register 566, receiving more operands, multiplying them together, adding the new product to register 566, etc.

Once all operands have been received by skip module 504, skip module 504 may set an "is_last?" bit to a most-recently generated operand vector to "1." This way, when this operand vector is received at PE 561 (and at PEs 562-564), PE 561 may be able to determine that this is a last operand. Thus, once PE 561 multiplied the last splat operand by a corresponding non-splat operand and adds the product to register 565, the value in register 565 may be ready to be passed to a next row. For example, this final value of register 565 may be copied to register 575. As an example, a final value of register 565 may be "49."

In addition, skip module 514 may receive a fourth splat operand from memory 512. The fourth splat operand may be zero, meaning it will be skipped. Skip module 514 may then receive a fifth splat operand from memory 512, which may be nonzero. In response, skip module 514 may generate an operand vector and send this operand vector to PE 571 (and PEs 572-574, as well as any other PEs in the same row). PE 571 may receive the operand vector, including the fifth splat operand and an index, from skip module 514. PE 571 may also receive a second non-splat operand from operand register 515.

For example, operand register 515 may include three numbered entries: Entry 1 (4), Entry 2 (7) and Entry 3 (2). The index included in the second operand vector may indicate which entry should be used as the non-splat operand. Thus, if the second operand vector has a splat operand of "4" and an index of "2," PE 571 may access register 515 to retrieve entry 2 (i.e., 7) for use as the non-splat operand corresponding to the second operand vector. Therefore, PE 571 may multiply the splat operand "4" by the non-splat operand "7," and add the result (4*7=28) into register 575. Thus, if register 575 had an initial value of 49 (copied from register 565), a value of register 575 may be 77 (as 49+28=77). If PE 571 then produces a product (via another splat operand and non-splat operand) of "6," register 575's value may be updated to (77+6)=83. As with the first row (i.e., PEs 561-564), once all nonzero operands of a set in memory 512 are utilized, PE 571 may indicate that register 575's value is final and is ready for output.

Skip module 524 may receive splat operand "0" from memory 522, and skip to a next operand. The next operand may be "2," so skip module 524 may generate an operand vector having a splat operand of "2" and an index of "2." This operand vector may be sent to PEs 581-584. Upon receiving the splat operand of "2" and the index of "2," PE 581 may access the second entry of operand register 525, multiply it by the splat operand, and add the product (2*34=68) to a next register (not shown in FIG. 5).

In some instances, PE 581 may need PE 571 to complete its operations before PE 581 can proceed. For example, if PE 581's register 585 needs a final value from register 575 but PE 571 has not added anything to register 575, PE 581 may need to wait for PE 571 to complete its operations and add results to register 575 before PE 581 can begin its own operations. Further, if PE 581 has skipped several operations (due to skip module 524 detecting and skipping zero-value splat operands) and if PE 571 has not skipped any operations, PE 581 may need to wait a relatively long time before PE 581's first nonzero operation can be performed.

In order to address this, in some instances, operands may be shuffled between rows. For example, memory 502 may include a first set of operands [2, 0, 2, 0, 0, 8, 3, 0], memory 512 may include a second set of operands [0, 3, 3, 1, 2, 1, 0, 5], and memory 522 may include a third set of operands [0, 0, 0, 6, 0, 0, 5, 0]. Because the third set has so many zero operands (i.e., six), PEs 581-584 may spend a significant amount of time waiting for PEs 571-574 to perform their operations before PEs 581-584 can perform theirs. This may be further exacerbated by the second set of operands having only two zero values, meaning PEs 571-574 may have substantially more work to do. Thus, in some instances, operands may be moved between memory 502, 512, and/or 522 to redistribute the zero-value operands and even out the workload. Continuing with the previous example, memory 502 may be modified to include a first modified set of operands [0, 0, 2, 0, 0, 8, 3, 5] (e.g., swapping the first "0" for the third set's "2," swapping the final "0" for the second set's "5"), memory 512 may be modified to include a second modified set of operands [0, 3, 0, 1, 2, 1, 0, 0], and memory 522 may be modified to include a third modified set of operands [2, 0, 3, 6, 0, 0, 5, 0]. This way, each set of operands has four zero values, reducing wasted time idling/waiting for other PEs to complete their work. Note that this is a simplified example for explanatory purposes; in actual implementations, the cost of moving individual operands between rows may outweigh any savings. In practice, rather than including 8 operands, memory 502 may include 8 operand sets, each set having thousands of individual operands, and entire sets may be shuffled between memory 502, memory 512, and memory 522. This shuffle may be performed by, for example, adjusting pointers to the sets. The corresponding non-splat operands may also be redistributed accordingly (e.g., amongst operand registers 505, 515, 525, etc.). Non-splat operands in operand register 535 may be similarly redistributed amongst non-splat operands in operand registers accessible to PE 574 and PE 584 (not shown in FIG. 5).

In some instances, wait times in some rows could "propagate down"; for example, if PE 571 is waiting for PE 561, then PE 581 may in turn need to wait for PE 571. As a result of this, zero values that are being skipped may have a larger impact the closer to the first row they are encountered. In other words, skipping significantly more operands in the last row than in the first row may result in increased wait times. Thus, in some instances, redistribution of the zero-value operands may be weighted to favor having a larger ratio of zero-value operands in earlier rows compared to later rows (but moving all zero-value operands to the first row is not necessarily ideal). For example, of ten zero-value operands in a three-row system, the zero-value operands may be rearranged such that five zero-value operands are in the first row, three are in the second row, and two are in the final row.

In some instances, register 565 may be used for input of non-splat operands for PE 571 (i.e., rather than operand register 515). However, this configuration might render several techniques discussed in this disclosure, such as redistributing zero-value operands among different rows, unfeasible, as it would change the order operations.

FIG. 6 depicts a portion of an example system 600 performing multiple MAC operations, consistent with several embodiments of the present disclosure. System 600 includes simple examples of values in memory 602 and memory 612, operand vectors generated by skip module 604 and skip module 614, multiply operations performed by processing element (PE) 661 and PE 671, non-splat operands stored in operand register 605 and operand register 615, and values stored in register 655, register 665, and register 675.

Memory 602 includes a set (or "data stick") including eight splat operands [3, 9, 0, 5, 0, 2, 0, 0]. These operands may be sent to and received by skip module 604, which may generate operand vectors based on whether each splat operand is zero or nonzero. Thus, skip module 604 can generate four operand vectors. Each operand vector also includes an index of the operand and an "is_last" bit; for example, the last nonzero operand is "2," which is the sixth operand in the data stick, so the last operand vector is [2, 6, 1]. These operand vectors can be sent to PE 661 for use in MAC operations.

Operand register 605 includes a different set of non-splat operands [1, 0, 5, 8, 4, 3, 0, 1]. In ordinary operation without skip module 604, PE 661 may multiply each pair of a splat operand and a corresponding non-splat operand together, adding the results to register 665. For example, 3*1, 0*9, 0*5, 5*8, 0*4, 2*3, 0*0, and 0*1. However, many of these operations would result in adding a value of zero to register 665, wasting computational time.

For each operand vector, PE 661 may retrieve a corresponding non-splat operand from operand register 605 based on an index of the operand vector. For example, upon receiving the operand vector [5,4,0] (which has an index of 4), PE 661 may retrieve a fourth value from operand register 605. The fourth value included in operand register 605 is 8, so PE 661 may multiply the splat operand of the operand vector (i.e., 5) by 8. In FIG. 6, non-splat operands that correspond to indices of operand vectors are marked by being enclosed in a square (i.e., 1, 0, 8, 3). Thus, skip module 604 enables skipping four MAC operations (those with zero-value splat operands), meaning PE 661 only needs to perform 3*1, 9*0, 5*8, and 2*3. While 9*0 may also result in wasted resources, as noted above, checking non-splat operands for zero values can cost more time than it saves.

With each multiplication operation, PE 661 may add the product to register 665. Register 665 may have an initial value n. In some instances, n may be copied from a different register 655. In some instances, n may have a default starting value, such as 0.

Example memory 612 includes a second set of splat operands [0, 4, 0, 0, 0, 1, 3, 0]. Skip module 614 receives these operands and creates operand vectors based on the nonzero operands. Operand register 615 includes a second set of non-splat operands [3, 8, 1, 1, 0, 2, 4, 0]. Similar to PE 661, PE 671 is configured to receive the operand vectors and for each operand vector, utilize the index of the vector to retrieve a corresponding non-splat operand from operand register 615. Once again, in FIG. 6, the non-splat operands in operand register 615 that correspond to an index of an operand vector received from skip module 614 are highlighted by being enclosed in a square (i.e., 8, 2, 4). Thus, rather than performing the full set of operations 0*3, 4*8, 0*1, 0*1, 0*0, 1*2, 3*4, 0*0], PE 671 need only perform multiplications 4*8, 1*2, and 3*4. These results are added to register 675, which started with the final value of register 665 (i.e., n+49). Thus, the final value of register 675 is n+49+(32+2+12)=n+49+46=n+95. As a clarifying example, if the initial value n of register 655 is 7, register 665 would have a final value of 7+49=56, and register 675 would have a final value of 56+46=102.

In some instances, systems and methods consistent with the present disclosure may be implemented to utilize relatively low precision data. For example, rather than 16-bit or 32-bit values (INT16 or INT32, respectively), in some instances, 8-bit or 4-bit values may be utilized (INT8 or INT4, respectively). This may enable use of simpler hardware, but in order to accomplish this, operands may be submitted to PEs and utilized in groups. For example, rather than a PE receiving a splat operand and retrieving a corresponding non-splat operand as with the examples discussed above, in some instances a PE may receive two splat operands and retrieve two corresponding non-splat operands. The PE may then multiply each pair together (i.e., may multiply a first splat operand by a first non-splat operand and multiply a second splat operand by a second non-splat operand), add the two products together, and utilize their sum as the output. This can be particularly advantageous as systems and methods consistent with the present disclosure can perform two INT8 MACs using the hardware designed for performing one INT16 MAC by using a group of 2 operands. An example is provided in FIG. 7, discussed below.

Figure 7:
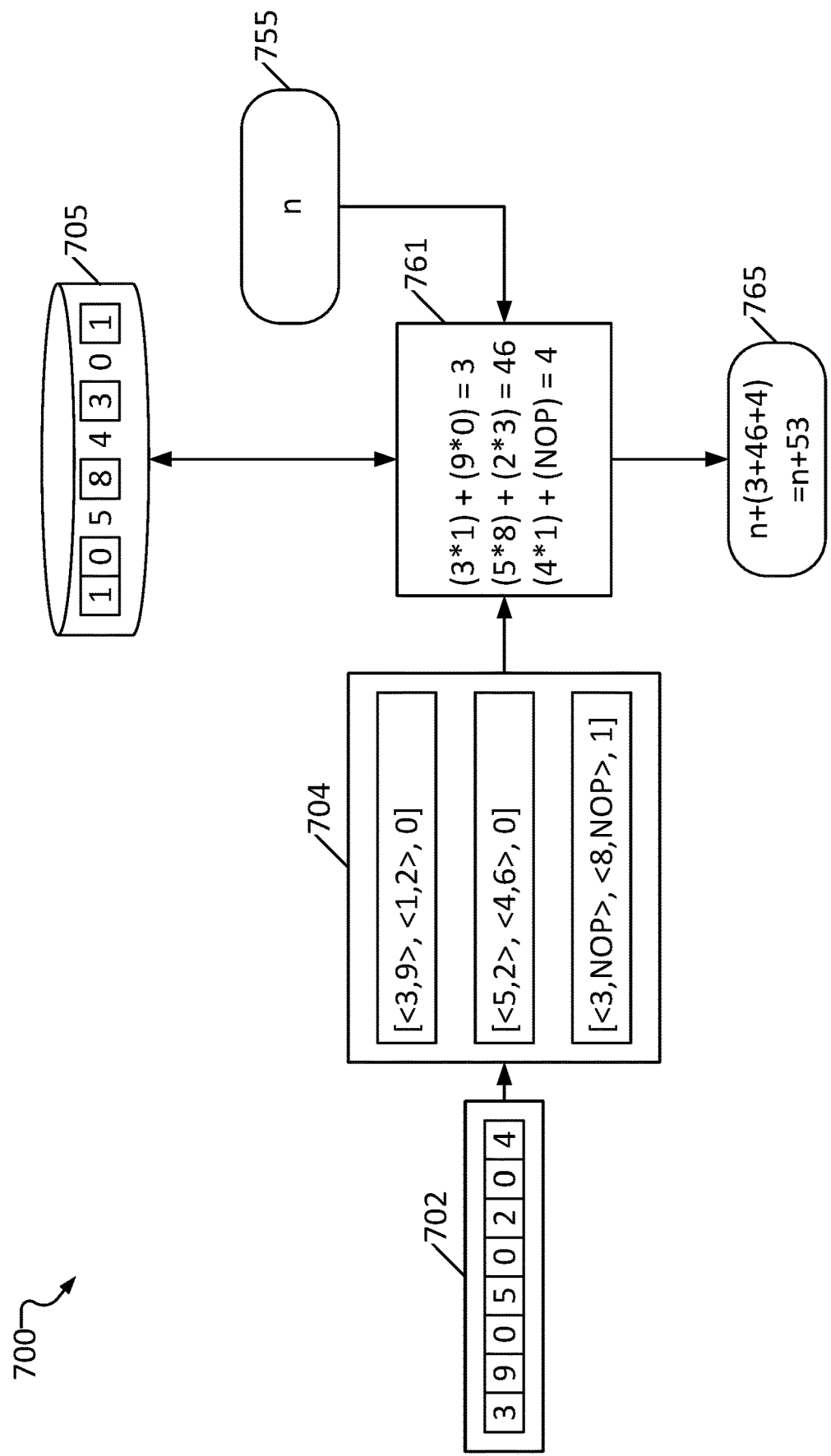
FIG. 7 depicts a system including a single PE configured to utilize multiple input operands, consistent with several embodiments of the present disclosure.

FIG. 7 depicts a system 700 including a single PE 761 configured to utilize multiple input operands, consistent with several embodiments of the present disclosure. System 700 includes memory 702 including splat operands, skip module 704 configured to generate operand arrays, operand register 705 including non-splat operands, and registers 755 and 765. Notably, skip module 704 generates operand arrays including pairs of splat operands and indices, as opposed to, for example, skip module 604 of FIG. 6 (whose operand vectors only include a single splat operand and index). For example, the first two nonzero splat operands received from memory 702 are 3 and 9, so skip module 704 generates a first operand array [<3, 9>, <1, 2>, 0]. PE 761 may then utilize the splat operands and indices to retrieve corresponding non-splat operands from operand register 705 (in this example, the first and second non-splat operands, which are 1 and 0, respectively). PE 761 may then multiply the first splat operand (3) by the first non-splat operand (1), multiply the second splat operand (9) by the second non-splat operand (0), and add the two products together (3*1)+(9*0)=3+0=3. The second operand array [<5,2>, <4,6>, 0] results in similar operations. However, as there are only 5 nonzero operands received from memory 702, skip module 704 is required to insert a "NOP" (or "no operation") into the final operand array. This may be required if, for example, PE 761 is configured to utilize INT8 inputs, requiring operands in pairs.

While the example depicted in FIG. 7 may function acceptably, the NOP represents an inefficiency. Thus, in some embodiments, systems and methods consistent with the present disclosure may utilize one or more multiplexers to enable a wider range of searching for nonzero operands. For example, FIG. 7 depicts eight operands, three of which are zero. In some instances, a system may be able to utilize an array of two 16:1 multiplexers to search a range of 32 operands for additional nonzero operands. In some instances, multiplexer sizes can be reduced by restricting the operand mapping. For example, using four 8:1 multiplexers for INT4, a 32-value-wide range can be checked, but each operand will need to fall within one of four groups arranged by an index i %4 (e.g., the first group is index 0, 4, 8, 12, 16, 20, 24, 28, 32; the second group is index 1, 5, 9, 13, 17, 21, 25, 29, etc.).

In some instances, execution of the various operations (such as, for example, MAC operations) may be performed using multiple threads. This may be useful for operations that take longer than one cycle. For example, MAC operations may take four cycles to complete, so interleaving operations across multiple threads may help to hide the pipeline latency. However, if all threads are executing an operation, then no additional operations can be initiated. Instead, no-operation (NOP) commands are issued during this time. To address this, in some instances, a number of interleaved threads may be increased to at least a latency of the operations being performed. For example, if MAC operations take 4 cycles, at least 5 interleaved threads may be utilized for multithreaded execution.

In some instances, multiple kinds of MAC hardware ("MAC units") can be utilized to implement systems and methods. For example, a 3-way MAC unit may be capable of reading in a previous row's output, multiplying two operands, and reading a current register all as part of one operation. As an example, referring briefly again to FIG. 6, PE 661 may be a 3-way MAC. In such an example, PE 661 may be capable of computing 5*8, receiving previous output n, and reading a current sum (3+0) and combining them all during the same operation. A 2-way MAC, however, may be simpler and thus easier to implement, but may not be as effective. Depending upon embodiment, different types of MACs may be implemented.

Figure 8:
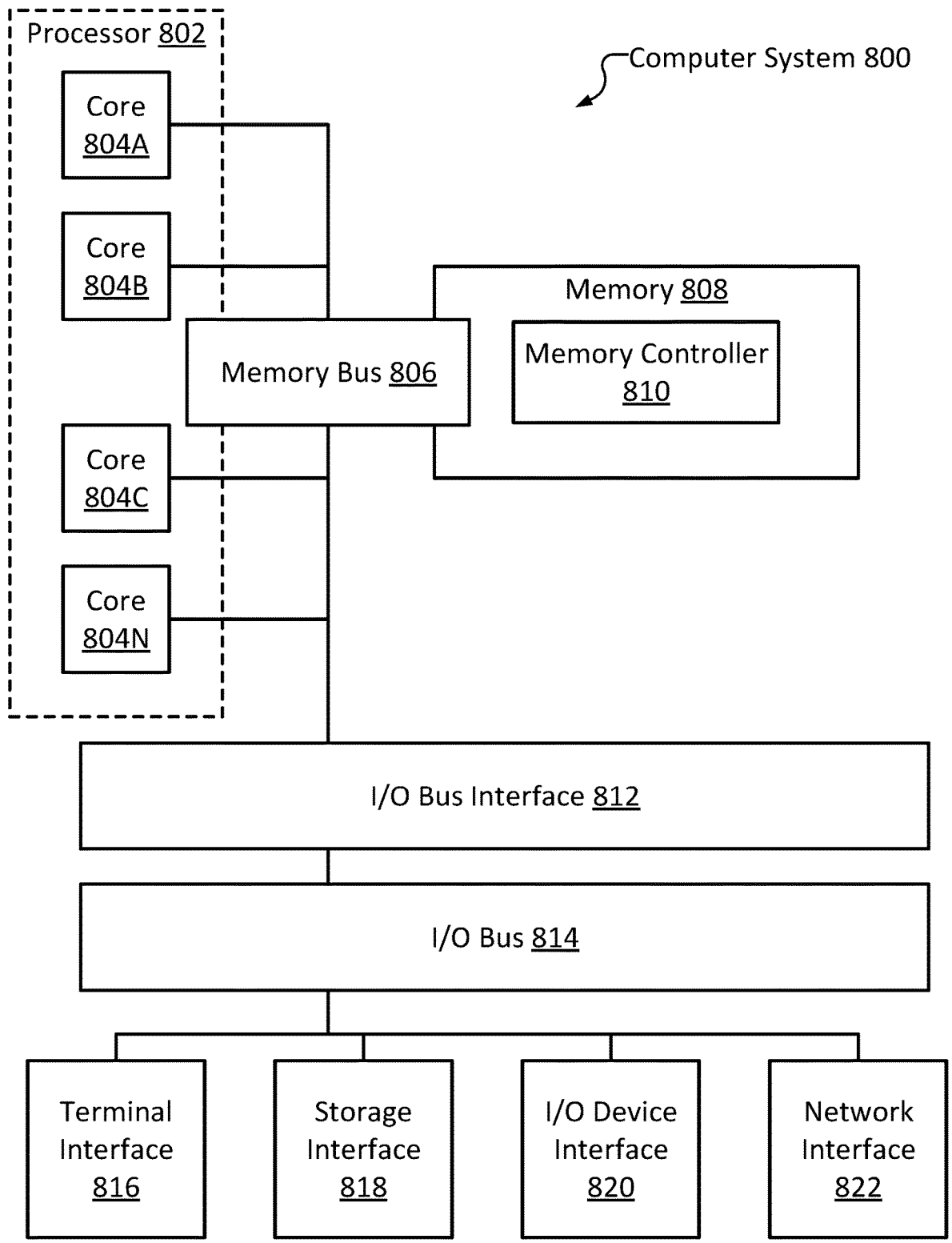
FIG. 8 illustrates a high-level block diagram of an example computer system that may be used in implementing embodiments of the present disclosure.

Referring now to FIG. 8, shown is a high-level block diagram of an example computer system 800 that may be configured to perform various aspects of the present disclosure, including, for example, methods 300 and 400. The example computer system 800 may be used in implementing one or more of the methods or modules, and any related functions or operations, described herein (e.g., using one or more processor circuits or computer processors of the computer), in accordance with embodiments of the present disclosure. In some embodiments, the major components of the computer system 800 may comprise one or more CPUs 802, a memory subsystem 808, a terminal interface 816, a storage interface 818, an I/O (Input/Output) device interface 820, and a network interface 822, all of which may be communicatively coupled, directly or indirectly, for inter-component communication via a memory bus 806, an I/O bus 814, and an I/O bus interface unit 812.

The computer system 800 may contain one or more general-purpose programmable processors 802 (such as central processing units (CPUs)), some or all of which may include one or more cores 804A, 804B, 804C, and 804N, herein generically referred to as the CPU 802. In some embodiments, the computer system 800 may contain multiple processors typical of a relatively large system; however, in other embodiments the computer system 800 may alternatively be a single CPU system. Each CPU 802 may execute instructions stored in the memory subsystem 808 on a CPU core 804 and may comprise one or more levels of on-board cache.

In some embodiments, the memory subsystem 808 may comprise a random-access semiconductor memory, storage device, or storage medium (either volatile or non-volatile) for storing data and programs. In some embodiments, the memory subsystem 808 may represent the entire virtual memory of the computer system 800 and may also include the virtual memory of other computer systems coupled to the computer system 800 or connected via a network. The memory subsystem 808 may be conceptually a single monolithic entity, but, in some embodiments, the memory subsystem 808 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 808 may contain elements for control and flow of memory used by the CPU 802. This may include a memory controller 810.

Although the memory bus 806 is shown in FIG. 8 as a single bus structure providing a direct communication path among the CPU 802, the memory subsystem 808, and the I/O bus interface 812, the memory bus 806 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 812 and the I/O bus 814 are shown as single respective units, the computer system 800 may, in some embodiments, contain multiple I/O bus interface units 812, multiple I/O buses 814, or both. Further, while multiple I/O interface units are shown, which separate the I/O bus 814 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface but receives requests from other computer systems (clients). Further, in some embodiments, the computer system 800 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 800. In some embodiments, however, individual components may have greater or lesser complexity than as represented in FIG. 8, components other than or in addition to those shown in FIG. 8 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system, comprising:
   a first row of processing elements;
   a memory; and
   a skip module, the skip module configured to:
      receive a sequence of operands from the memory, the sequence including at least a first operand and a second operand;
      generate a first operand vector based on an identification that the first operand is a nonzero operand;
      skip the second operand based on an identification that the second operand is a zero-value operand; and
      send the first operand vector to each processing element included in the first row of processing elements.

2. The system of claim 1, wherein a first processing element included in the first row of processing elements is configured to:
   receive the first operand vector from the skip module;
   identify the first operand from the first operand vector;
   receive a third operand; and
   perform an operation using the first operand and the third operand.

3. The system of claim 2, wherein the operation includes a multiply-accumulate (MAC) operation.

4. The system of claim 3, wherein the first processing element is a 3-way MAC unit.

5. The system of claim 2, further comprising a first register, wherein the first processing element is further configured to store a result of the operation in the first register.

6. The system of claim 5, further comprising:
   a second register;
   an operand register; and
   a second row of processing elements, wherein a second processing element included in the second row of processing elements is configured to:
      receive a value from the first register;
      store the value in the second register;
      receive a second operand vector;

identify a fourth operand from the second operand vector;
receive a fifth operand from the operand register; and
perform a second operation using the fourth operand and the fifth operand.

7. The system of claim 5, wherein the second processing element is further configured to add a second result of the second operation to the value stored in the second register.

8. The system of claim 2, wherein:
the performing the operation requires a first number of cycles;
the processing elements are configured to execute via a second number of threads; and
the second number is greater than the first number.

9. The system of claim 1, wherein sequence of operands includes a third operand and wherein the skip module is further configured to:
generate a second operand vector based on an identification that the third operand is a nonzero operand;
determine a first index for the first operand vector based on a first position of the first operand within the sequence, wherein the first operand vector includes the first index; and
determine a second index for the second operand vector based on a second position of the third operand within the sequence, wherein the second operand vector includes the second index.

10. The system of claim 9, wherein a processing element included in the first row of processing elements is configured to:
receive the second operand vector from the skip module;
identify the third operand from the second operand vector;
identify the second index from the second operand vector;
retrieve a fourth operand from an operand register based on the second index; and
perform an operation using the third operand and the fourth operand.

11. The system of claim 1, further comprising a second row of processing elements, wherein the skip module is further configured to:
identify a first number of nonzero operands for use by the first row of processing elements;
identify a second number of nonzero operands for use by the second row of processing elements; and
redistribute nonzero operands amongst the first row and the second row based on the first number and the second number.

12. The system of claim 1, wherein the skip module further includes a plurality of multiplexers configured to enable the skip module to select sequential nonzero operands across a range of operands.

13. A skip module apparatus, the skip module apparatus configured to:
receive a sequence of operands from a memory, the sequence including at least a first operand a second operand;
generate a first operand vector based on an identification that the first operand is a nonzero operand;
skip the second operand based on an identification that the second operand is a zero-value operand; and
send the first operand vector to each processing element included in a first row of processing elements.

14. The skip module apparatus of claim 13, further configured to:
determine a first index for the first operand vector based on a first position of the first operand within the sequence, wherein the first operand vector includes the first index.

15. The skip module apparatus of claim 13, wherein the skip module is further configured to:
identify a first number of nonzero operands for use by the first row of processing elements;
identify a second number of nonzero operands for use by a second row of processing elements; and
redistribute nonzero operands amongst the first row and the second row based on the first number and the second number.

16. A method, comprising:
receiving a sequence of operands from a memory, the sequence including at least a first operand and a second operand;
generating a first operand vector based on an identification that the first operand is a nonzero operand;
skipping the second operand based on an identification that the second operand is a zero-value operand; and
sending the first operand vector to each processing element included in a first row of processing elements.

17. The method of claim 16, further comprising:
determining a first index for the first operand vector based on a first position of the first operand within the sequence, wherein the first operand vector includes the first index.

18. The method of claim 16, further comprising:
identifying a first number of nonzero operands for use by the first row of processing elements;
identifying a second number of nonzero operands for use by a second row of processing elements; and
redistributing nonzero operands amongst the first row and the second row based on the first number and the second number.

19. The skip module apparatus of claim 13, wherein the sequence of operands includes a third operand and wherein the skip module apparatus is further configured to:
generate a second operand vector based on an identification that the third operand is a nonzero operand; and
send the second operand vector to each processing elements included in the first row of processing elements.

20. The method of claim 16, wherein the sequence includes a third operand and the method further comprises:
generating a second operand vector based on an identification that the third operand is a nonzero operand; and
sending the second operand vector to each processing elements included in the first row of processing elements.

* * * * *